UNITED STATES PATENT OFFICE.

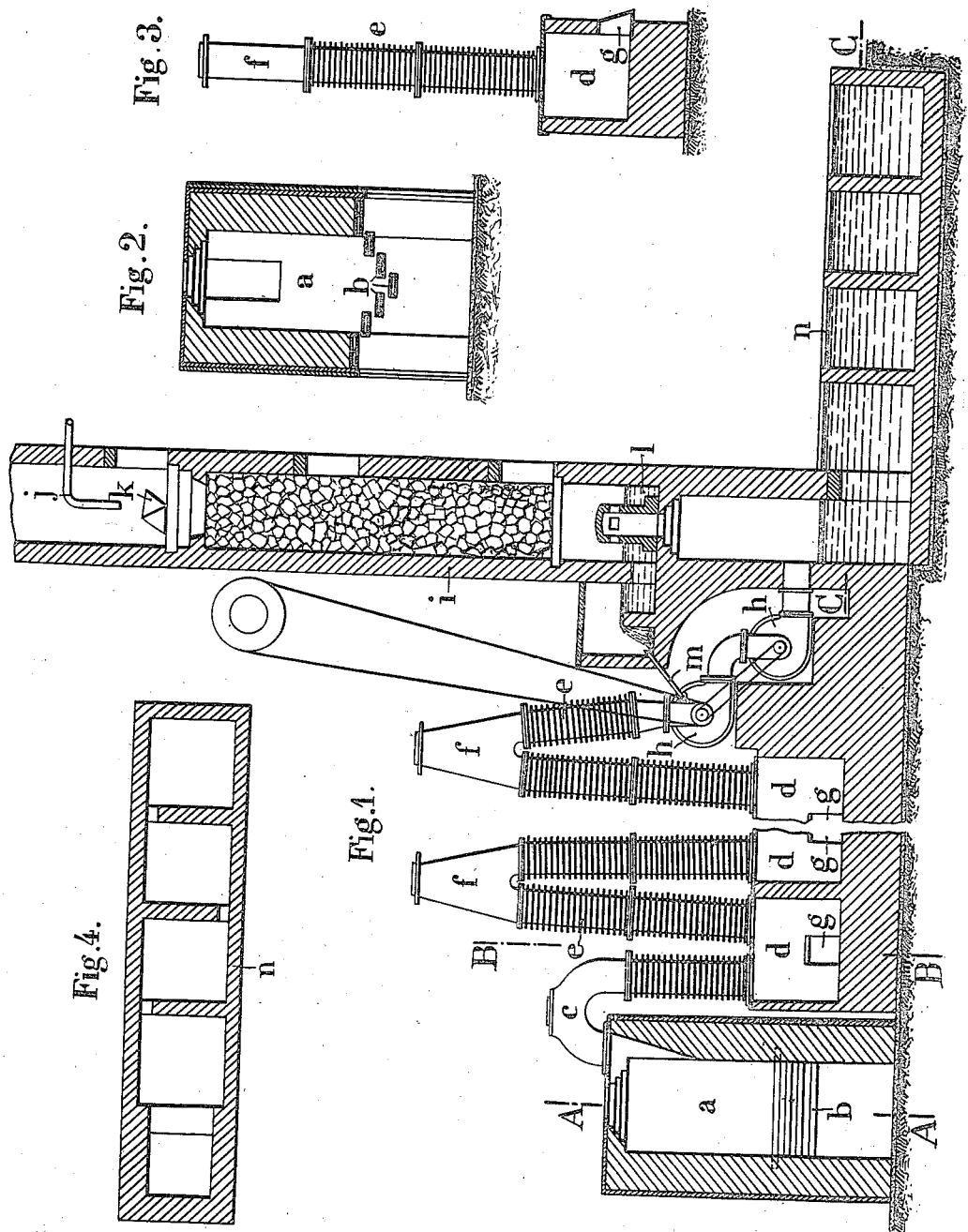

HENRI LOUIS HERRENSCHMIDT, OF PARIS, FRANCE.

PROCESS OF TREATING ANTIMONY ORES.

948,545.

Specification of Letters Patent.

Patented Feb. 8, 1910.

Application filed June 14, 1907. Serial No. 379,050.

*To all whom it may concern:*

Be it known that I, HENRI LOUIS HERRENSCHMIDT, of 83$^{bis}$ Rue La Fayette, in the city of Paris, Republic of France, engineer, have invented a Process of Treating Antimony Ores, of which the following is a full, clear, and exact description.

This invention has for its object a process of treating antimonious ores containing arsenic whereby to recover the antimony, completely freed from arsenic in whatever proportions the latter may be present.

The process is based essentially on the treatment, in the dry way, of the coarsely crushed or graded ores and the treatment, in the wet way, of the fine and pulverulent portion.

According to my invention the arsenical antimony ore previously coarsely graded or crushed is treated in a roasting furnace so as to cause it to give off a mixture of oxid of antimony and arsenious acid together with sulfur dioxid which is separated and subsequently utilized as hereinafter described. The roasting of the ore is performed at a low temperature, say, about 400° C. in order to obviate any agglomeration of residue in the furnace, to permit of the employment of cast metal apparatus as will be seen hereinafter and to reduce fuel consumption.

The finely divided unroasted ores are mixed either with carbonate of soda and lime, with soda waste to which has been added carbonate or sulfate of soda or with sulfid of sodium. The mixture thus obtained is charged into an autoclave containing water which is then boiled until the pressure reaches about four or five atmospheres. During this operation there is formed a mixture of antimoniate or sulfoantimoniate of soda (or both) and of arsenate or sulfo-arsenate of soda (or both). After the completion of this operation the contents of the autoclave are discharged into a vat and a liquor titrating 2° to 3° Baumé, is drawn off containing the above-mentioned mixture of antimoniate or sulfo-antimoniate of soda and arsenate or sulfo-arsenate of soda (or both). This liquor is then caused to re-act with the mixture of oxid of antimony and arsenious acid resulting from the above-mentioned furnace treatment of the coarse ore. In this re-action there are formed oxids or sulfids of antimony (or both) which remain mixed with the oxids of antimony first obtained, while the arsenic dissolves in the solution containing the sulfo-arsenate or arsenate of soda (or both) and the antimoniate or sulfo-antimoniate of soda in excess. The sulfids and oxids of antimony thus freed from arsenic may be collected by filtration or by decantation and are thereafter mixed with a flux and fused whereby a regulus of antimony free from arsenic is obtained.

The antimony contained by the liquor into which the arsenic has passed is then separated therefrom, either by means of the sulfur dioxid disengaged during the roasting of the coarse ore, or by means of any other suitable acid, sulfid of antimony being thus formed, while arsenate or sulfo-arsenate of soda mixed with sulfite of soda remains in the solution. The sulfid of antimony is separated and is either converted into oxid or reduced to the metallic form. The sulfite of soda is finally freed from arsenate, or sulfoarsenate of soda by crystallization. It will be seen therefore that the present process permits not only of the complete extraction of the antimony whatever may be the proportion of arsenic mixed therewith, but also of the economical utilization of the more finely divided ores.

For the economical working of the process on an industrial scale the apparatus, which is illustrated by way of example in the accompanying drawing, may be employed.

Figure 1 is a longitudinal section, Figs. 2 and 3 transverse vertical sections on lines A—A, and B—B respectively of Fig. 1, and Fig. 4 a horizontal section on line C—C of Fig. 1.

As shown in Fig. 1, the apparatus comprises in the first place a roasting furnace $a$ provided with hollow fire-bars $b$ arranged in steps and symmetrically disposed so as to permit the residues, freed from antimony, and arsenic, to easily fall through the grate as the roasting proceeds. The ore is mixed in the furnace with but a very small quantity of coke, say from 3 to 5% with the object of conducting the roasting at as low a temperature as practicable viz., about 400° C., under which conditions the volatilization of the antimony and arsenic may be effected without any agglomeration of the residues being occasioned, the latter remaining in a divided state which permits of their easy withdrawal from between the fire-bars.

The low temperature under which the volatilization of the arsenic and antimony is effected renders it possible to employ pipes $c$ of cast iron for conducting the gases directly from the furnace outlet to the condensing apparatus.

The condensing apparatus is constituted by a series of masonry or by metal (wrought or cast iron) chambers or compartments $d$ surmounted and connected by ribbed or "gilled" pipes $e$ whereof each pair connecting consecutive chambers or compartments $d$ are connected by unions $f$ as illustrated. Each chamber $d$ is provided at its lower part with a door $g$, to enable the oxids of antimony and arsenious acid to be removed as they become condensed and while the furnace is in operation. The gases (sulfurous acid, oxid of antimony and uncondensed arsenious acid) are drawn off by means of aspirators $h$ and driven into the base of a reaction tower $i$.

The liquor containing the antimoniate or sulfo-antimoniate of soda and arsenate or sulfo-arsenate of soda resulting as above described from the treatment of the finely divided ores in the autoclave, is fed into the upper part of this tower by the pipe $j$ and falls on to the tippler $k$ whereby it is discharged in streams on to the coke below through which it flows into the tank $l$ situated at the lower part of the tower, the liquor in said tank being maintained at a constant level by overflowing through a launder $m$ into the aspirators $h$ whence it escapes to a receptacle. The liquor is traversed during its descent in the tower by the sulfurous acid driven up the tower by the aspirators. The liquor which overflows from the tank at a constant level $l$ into the aspirator $h$ and which contains oxid and sulfid of antimony in suspension in sodium sulfite and arsenate or sulfo-arsenate finally flows into the settling tanks $n$.

The above described process and arrangement of apparatus offers the following advantages: 1st. The winning of antimony completely free from arsenic whatever proportion of the latter may be present in the ore treated. 2nd. Economy in fuel consumption. 3rd. The employment of cast iron in the construction of those parts of the apparatus in immediate proximity to the exit of the furnace, thus lessening the cost of the installation, rendering the apparatus less cumbrous and capable of being quickly erected, and when necessary taken down and reërected. 4th. The possibility of collecting the oxids of antimony and the arsenious acid as they are condensed without interfering with the operation of the furnace. 5th. The quick starting and stopping of the operation and the stopping thereof without inconvenience.

The apparatus may be employed equally well for treating other ores, such as ores of zinc, mercury and the like.

Claims.

1. Process for the treatment of antimonious ores containing arsenic, characterized by the combination of the following operations: (a) crushing the ore to form it into coarse and fine particles; (b) roasting the coarse ores for the purpose of obtaining sulfurous acid and a mixture of oxid of antimony and arsenious acid; (c) boiling the finely divided ores with an alkaline solvent under pressure; (d) separating the arsenic from the mixture of oxid of antimony and arsenious acid obtained in operation (b) by means of the solution obtained in operation (c); (e) precipitating the antimony contained in the arsenical and alkaline liquor obtained in operation (d) by means of sulfurous acid resulting from operation (b).

2. Process for the treatment of antimony ores containing arsenic which consists in crushing the ore, boiling the fine portion of the ore with an alkaline solution under pressure, roasting the coarse portion of the ore, and then treating the mixture (of oxid of antimony and of arsenious acid) obtained by the roasting of the coarse portion of the ore with the solution obtained by boiling the fine portion of the ore with an alkaline solution under pressure.

3. Process for the treatment of antimony ores containing arsenic, which consists in crushing the ore, then boiling the fine portion of the ore with an alkaline solvent and roasting the coarse portion of the ore, then separating the arsenic from the mixture obtained by the roasting operation by means of the solution obtained by the boiling operation.

4. Process for treatment of antimony ores containing arsenic, which consists in crushing the ore, then boiling the fine portion of the ore with an alkaline solvent and roasting the coarse portion of the ore, then separating the arsenic from the mixture obtained by the roasting operation by means of the solution obtained by the boiling operation and precipitating the antimony contained in the liquor obtained by the separating operation, by means of sulfurous acid resulting from the roasting operation.

The foregoing specification of my process of treating antimony ores signed by me this 24th day of May 1907.

HENRI LOUIS HERRENSCHMIDT.

Witnesses:
DEAN B. MASON,
MAURICE H. PIGNET.